May 21, 1935.

L. RICCI

Re. 19,582

ALL METAL TIRE COVER

Original Filed Dec. 6, 1930 2 Sheets-Sheet 1

Leonardo Ricci

INVENTOR

BY Victor J. Evans and A. L. Evans ATTORNEYS

May 21, 1935. L. RICCI Re. 19,582

ALL METAL TIRE COVER

Original Filed Dec. 6, 1930 2 Sheets-Sheet 2

Leonardo Ricci
INVENTOR

BY Victor J. Evans
and A. L. Evans ATTORNEYS

Reissued May 21, 1935 Re. 19,582

UNITED STATES PATENT OFFICE 19,582

ALL METAL TIRE COVER

Leonardo Ricci, New Kensington, Pa., assignor of ten per cent to Gaetano Latona and three per cent to Amerigo Posati, both of Arnold Borough, Westmoreland County, Pa.

Original No. 1,917,157, dated July 4, 1933, Serial No. 500,613, December 6, 1930. Application for reissue December 13, 1934, Serial No. 757,405

5 Claims. (Cl. 150—54)

This invention relates to tire locks for holding the spare tires of automobiles, an object being to provide a rack which may be mounted upon an automobile to receive and inclose a tire to protect the same from the action of the sun, and is also dustproof and rainproof, so that rapid deterioration of the tire will be prevented.

Another object of the invention is the provision of a tire carrier or rack which will also serve as a carrier for a parking or tail lamp, or both, the construction being such that the lens of the lamp may be removed and the lamp used as a trouble lamp.

Another object of the invention is the provision of a device of the above character, which is neat and attractive in appearance, may be easily kept clean, and will afford protection against the theft of the tire.

With the above and other objects in view, the invention further includes the following novel features and details of construction, to be hereinafter more fully described, illustrated in the accompanying drawings and pointed out in the appended claims.

In the drawings:—

Figure 1:
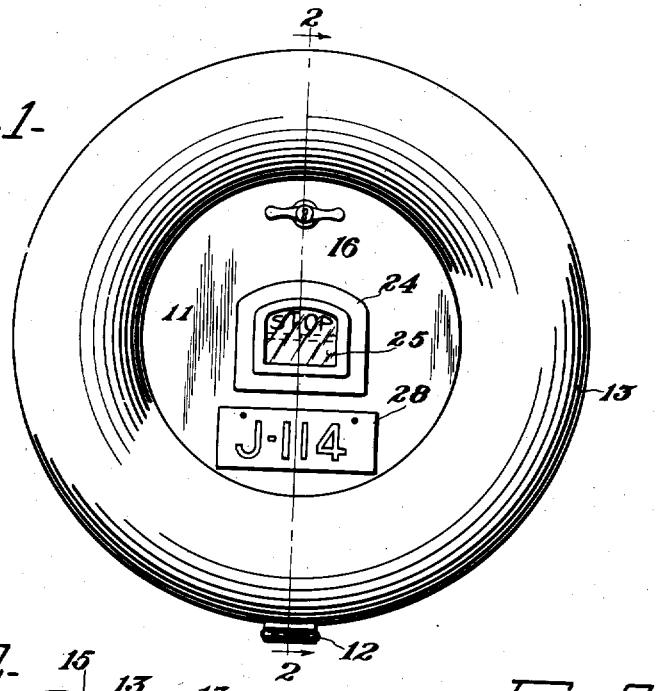
Figure 1 is an elevation illustrating the invention.
Figure 2:
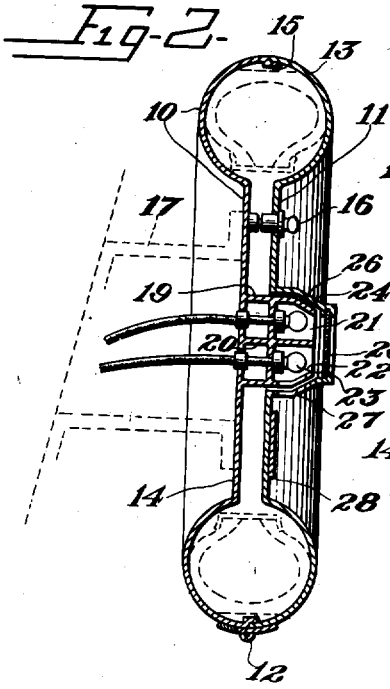
Figure 2 is a section on the line 2—2 of Figure 1 showing the carrier closed.
Figure 3:
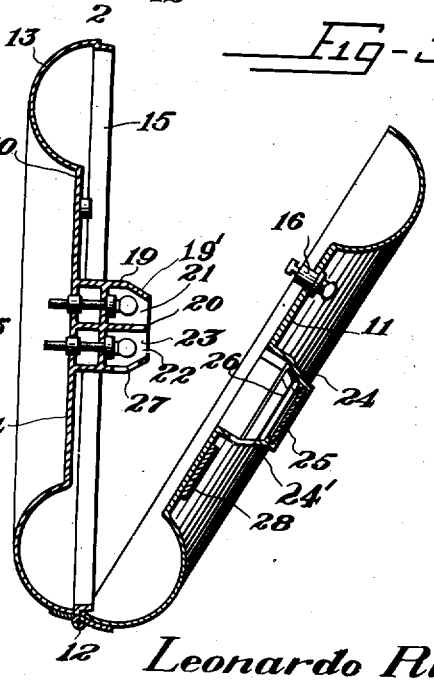
Figure 3 is a like view with the carrier open.

Referring to the drawings in detail wherein like characters of reference denote corresponding parts, the form of the invention shown in Figures 1, 2 and 3 is designed for carrying a demountable rim and tire. This form of the invention is made up of sections 10 and 11 which are hingedly connected as shown at 12 and which may be opened as shown in Figure 3 to receive and remove a tire, or closed as shown in Figures 1 and 2 to carry a tire in a manner to protect it from the weather, as well as theft, dust and dirt. Each of the sections comprises an annular transversely curved tire receiving portion 13, whose annular inner edge is connected by a plate 14, while the outer edge of the section 10 is provided with an annular inset flange 15 with which the outer edge of the section 11 overlaps so as to provide a tight joint.

A lock 16 is carried by the outer section 11 by means of which the sections may be securely locked in closed position to prevent theft, while the inner section may be attached to a convenient portion of the automobile through the medium of brackets 17, or other suitable attaching means.

Extending axially from the section 10 is a housing 19 which provides a lamp housing and this housing may be divided by means of a partition 20 into separate lamp compartments 21 and 22, for the accommodation of lamps 23. These lamps may be connected in suitable circuits and controlled by suitable switches to provide signal lamps, such as the tail lamp and stop lamp.

The forward end of the casing 19 is open and provided with an inwardly tapered portion 19'. The character 24 denotes a collar or sleeve which extends axially from the section 11 and of substantially rectangular formation in cross section. This collar or sleeve 24 has the walls thereof adjacent its forward end tapered inwardly to provide within the sleeve 24 a tapering seat portion 24'. A cushioning gasket 26 is arranged within the sleeve 24, upon its seat 25', consequently, as the casing 19 enters the sleeve 24, the forward tapering portion 19' thereof will be forced upon the seat 24', and the gasket 25 will engage around the tapering portion 19', thereby assuring of a snug or wedge-tight fitting of the casing 19 within the housing or sleeve 24 to assure against rattling due to unnecessary vibrations of the vehicle on which the tire casing is mounted.

Figure 4:
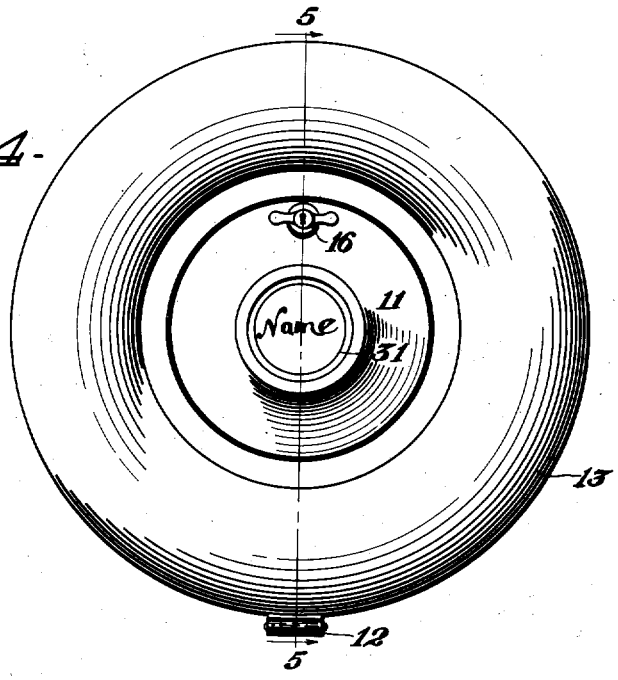
Figure 4 is an elevation showing a slightly different form of the invention.
Figure 5:
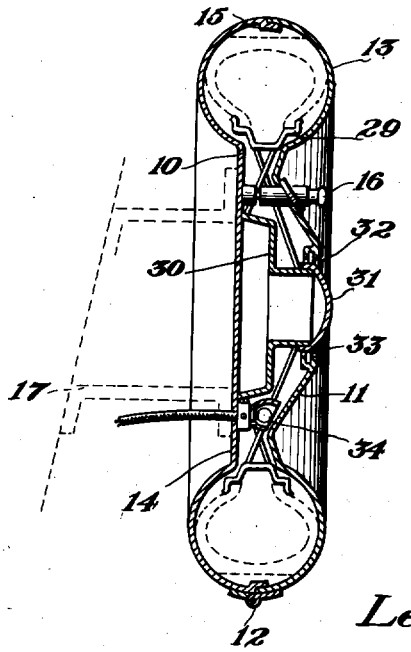
Figure 5 is a section on the line 5—5 of Figure 4.

The form of the invention shown in Figure 4 is designed for the accommodation of an automobile wire wheel indicated at 29. The construction of the carrier is substantially the same as that previously shown and described except that the section 10 is flat for the accommodation of the hub 30 of the wheel 29, the cap 31 of this hub extending through an opening 32 provided in the section 11. A gasket 33 extends around this opening and engages the hub cap.

A trouble light 34 may be carried by the section 10 so that when the carrier is open it will provide illumination at the rear of the automobile.

The invention is susceptible of various changes in its form, proportions and minor details of construction and the right is herein reserved to make such changes as properly fall within the scope of the appended claims.

I claim as my invention:

1. In a tire carrier, a casing formed of two hingedly connected sections, a holder having a forward open end carried by and projecting axially from one section, said holder being provided with a tapering open outer end, a sleeve carried by and extending axially from said outer section to receive therein the holder and form a closure therefor, said sleeve being provided with a tapering seat portion arranged interiorly thereof and upon which the tapering forward end of the holder is seated, and a gasket surrounding the said holder and engaging with the inner circumference of the sleeve for preventing the rattling of the sections of the casing when in closed position.

2. In a carrier for the spare wheel or tire of an automobile the combination of a generally discular housing element having an annular trough portion arranged peripherally thereof, a second discular housing element having a peripherally arranged trough portion matching that of the first named discular element, the concave faces of said trough portions being presented toward each other and said elements having a force-fitting engagement with each other, one of said discular elements having its radially interior portion swelling forwardly from the plane of the annular junction line between said radially interior portion and the trough portion of said discular housing element to a central opening in the radially interior portion of the element, said central opening arranged to receive the hub of a wheel embraced by the carrier.

3. In a carrier for the spare wheel or tire of an automobile the combination of a generally discular housing element having an annular trough portion arranged peripherally thereof, a second discular housing element having a peripherally arranged trough portion matching that of the first named discular element, the concave faces of said trough portions being presented toward each other and said elements having a force-fitting engagement with each other, one of said discular elements having its radially interior portion swelling forwardly from the plane of the annular junction line between said radially interior portion and the trough portion of said discular housing element to a central opening in the radially interior portion of the element, said central opening arranged to receive the hub of a wheel embraced by the carrier, and means positively to interengage the two said generally discular elements of the carrier.

4. In a carrier for the spare wheel or tire of an automobile the combination of a generally discular housing element having an annular trough portion arranged peripherally thereof, a second discular housing element having a peripherally arranged trough portion matching that of the first named discular element, the concave faces of said trough portions being presented toward each other and said elements having interengagement at their peripheral edges, one of said discular elements having its radially interior portion swelling forwardly from the plane of the annular junction line between said radially interior portion and the trough portion of said discular housing element to a hub-receiving region of the said discular element arranged to receive the hub of a wheel embraced by the carrier.

5. The combination of claim 4 in which the interengagement at the peripheral edges of the trough portions of the discular elements is resilient.

LEONARDO RICCI.